United States Patent [19]

Ketels

[11] Patent Number: 4,513,477
[45] Date of Patent: Apr. 30, 1985

[54] METHOD FOR REMOVING SOLID PARTICLES FROM A PASTY MASS

[75] Inventor: Gerardus H. J. Ketels, Grave, Netherlands

[73] Assignee: Procom, B.V., Oss, Netherlands

[21] Appl. No.: 548,329

[22] Filed: Nov. 7, 1983

Related U.S. Application Data

[62] Division of Ser. No. 320,611, Nov. 12, 1981, Pat. No. 4,443,912.

[30] Foreign Application Priority Data

Oct. 6, 1981 [NL] Netherlands .................. 8104544

[51] Int. Cl.³ .................. A22C 17/00; B02C 18/20; B02B 7/04
[52] U.S. Cl. .................. 17/46; 17/1 G; 241/74; 241/82.3
[58] Field of Search .................. 17/46, 1 G; 241/24, 241/74, 82.3

[56] References Cited

U.S. PATENT DOCUMENTS

| | | | |
|---|---|---|---|
| 3,739,994 | 6/1973 | McFarland | 241/82.3 X |
| 4,025,001 | 5/1977 | Yarem et al. | 241/74 X |
| 4,189,104 | 2/1980 | dos Santos | 241/82.3 |

Primary Examiner—Willie G. Abercrombie
Attorney, Agent, or Firm—Harness, Dickey & Pierce

[57] ABSTRACT

A method and apparatus for removing solid particles from a pasty mass, in particular for removing bone particles from a mass of meat particles, in which the mass is advanced through at least one slit-shaped channel defined between two walls spaced apart in parallel relation at least one wall being provided with apertures having a diameter smaller than the smallest of the largest dimension of the particles to be removed, and the spacing between the walls being smaller than the smallest of the largest dimension but larger than the largest of the smallest dimension of the particles to be removed. During the advancement of the mass through said channel a scraping action is exercised over the inner surface of the apertured wall by means of one or more scraping elements.

3 Claims, 3 Drawing Figures

METHOD FOR REMOVING SOLID PARTICLES FROM A PASTY MASS

This is a division of application Ser. No. 320,611, filed Nov. 12, 1981, now U.S. Pat. No. 4,443,912, issued Apr. 24, 1984.

The invention relates in the first place to a method for removing solid particles from a pasty mass. In particular, the invention relates to a method for removing bone particles from a mass of meat particles.

There is known a method for removing from bones coming from butcher's shops the meat portions still attached thereto, by treating said bones under high pressure. The meat portions obtained thereby are excellent suitable for human consumption but include relatively small bone particles which dependant on certain regulations dictated by the authorities should be removed before said meat is allowed to serve for human consumption.

The object of the invention is to provide a method for removing bone particles from such a mass of meat such that the cleaned meat meets the dictated standards.

This object is achieved by the method according to the invention, in which the mass of meat to be treated is advanced through at least one slit-shaped channel, which channel has at least one boundery wall in which one or more apertures are provided having a diameter smaller than the smallest of the largest dimension of the particles to be removed and a boundery wall extending in parallel spaced relation to said wall, in which said spacing is smaller than the smallest of the largest dimension but larger than the largest of the smallest dimension of the particles to be removed, the meat portions coming to the outside through the apertures are received and the solid particles coming outside at the outlet of the channel are discharged.

In this way, in the advancement of the mass of meat through the slit-shaped channel the solid particles are directed by the boundery walls of the channel such that said particles come to lie with their largest dimensions substantially parallel to said boundery walls. Thus, said solid particles cannot tilt in the channel such that they come to lie with their largest dimensions perpendicular to the wall provided with the apertures and consequently, cannot go outside through said apertures as the diameter of said apertures is smaller than said largest dimensions, so that said solid particles are advanced to the outlet through the entire channel in order to be discharged finally. However, said mass of meat indeed go outside through said apertures and then, is free from the solid particles which are not allowed to be present.

As a mass of meat portions is relatively tacky-adhesive this meat portions tend to accumulate in and at the apertures, by which said apertures could become clogged because there it is not allowed to advance the mass of meat through the slit-shaped channel under a too high pressure in view of the heat development occurring thereby which is harmful for the meat.

Therefore, during advancing the mass of meat through the slit-shaped channel it is preferred to scrape over the inner surface of the wall provided with the apertures by means of one or more scraping elements.

The invention relates also to an apparatus for carrying out the method according to the invention, which apparatus is characterized in that it comprises at least one slit-shaped channel having an inlet and an outlet and being bounded by at least one wall in which one or more apertures are provided, and a wall extending in parallel and spaced relation to said wall, in which said spacing is of the same order of magnitude as the diameter of said apertures, means for supplying the mass to be treated to the inlet of the channel and for advancing it through this channel, means for receiving the treated mass coming to the outside through said apertures, and discharge means communicating with the outlet of the channel.

In the channel at least one scraping element may be provided adapted to scrape over the inner surface of the apertured wall.

Preferable, the boundery walls of the slit-shaped channel are formed by two concentric circular plates extending parallel to each other with said spacing, the means for supplying the mass to be treated being formed by an annular channel extending along the outer circumferences of said plates, and said discharge means at the center of the plates communicating with the slit-shaped channel between said plates.

The plate opposite to the apertured plate may be mounted for rotation and be provided at its inner side with one or more protruding elements adapted to scrape over the inner surface of the apertured plate during rotation of the plate. In an advantageous way, said scraping elements may be formed by a set of protruding strips extending from the circumference of the plate in curved shape in the direction to the center, by which during the rotation of said plate in the direction to which the hollow sides of the scrapers are faced an additional radially inwardly directed pressure is excerted on the mass by said scraping elements.

In a preferred embodiment of the apparatus according to the invention the rotatable plate is fixed at its center around the end portion of a rotatable shaft of which the end face defines a boundery of a central space communicating with the slit-shaped channel between the surface of the rotatable plate facing to the same direction as the end face of the shaft and the apertured opposite plate and communicating with the discharge for the separated solid particles, while in the shaft an annular groove is provided extending along the circumference thereof which groove is in communication with the slit-shaped channel between the other surface of the rotatable plate and the opposite apertured plate and, through at least one radial bore with an axial bore extending through said shaft and opening in said central space. Thus, in this way with only one rotatable plate two slit-shaped channels are formed, by which a compact apparatus with a high capacity is obtained.

Advantageously the apertured plate is received in a housing through which the shaft extends from one side, in which housing two annular chambers are formed for receiving the treated mass, each chamber opposing the surface of one of the apertured plates facing from the rotatable plate, and communicating with a discharge for the treated mass, while in the housing an annular channel is formed extending around the circumference of the rotatable plate and communicating with both slit-shaped channels and in which a feed for the mass to be treated opens.

The invention will be explained in more detail with reference to an exemplary embodiment of the apparatus according to the invention shown in the drawing wherein:

FIG. 1a shows on a larger scale the encirceled portion in FIG. 1, and

Figure 1:
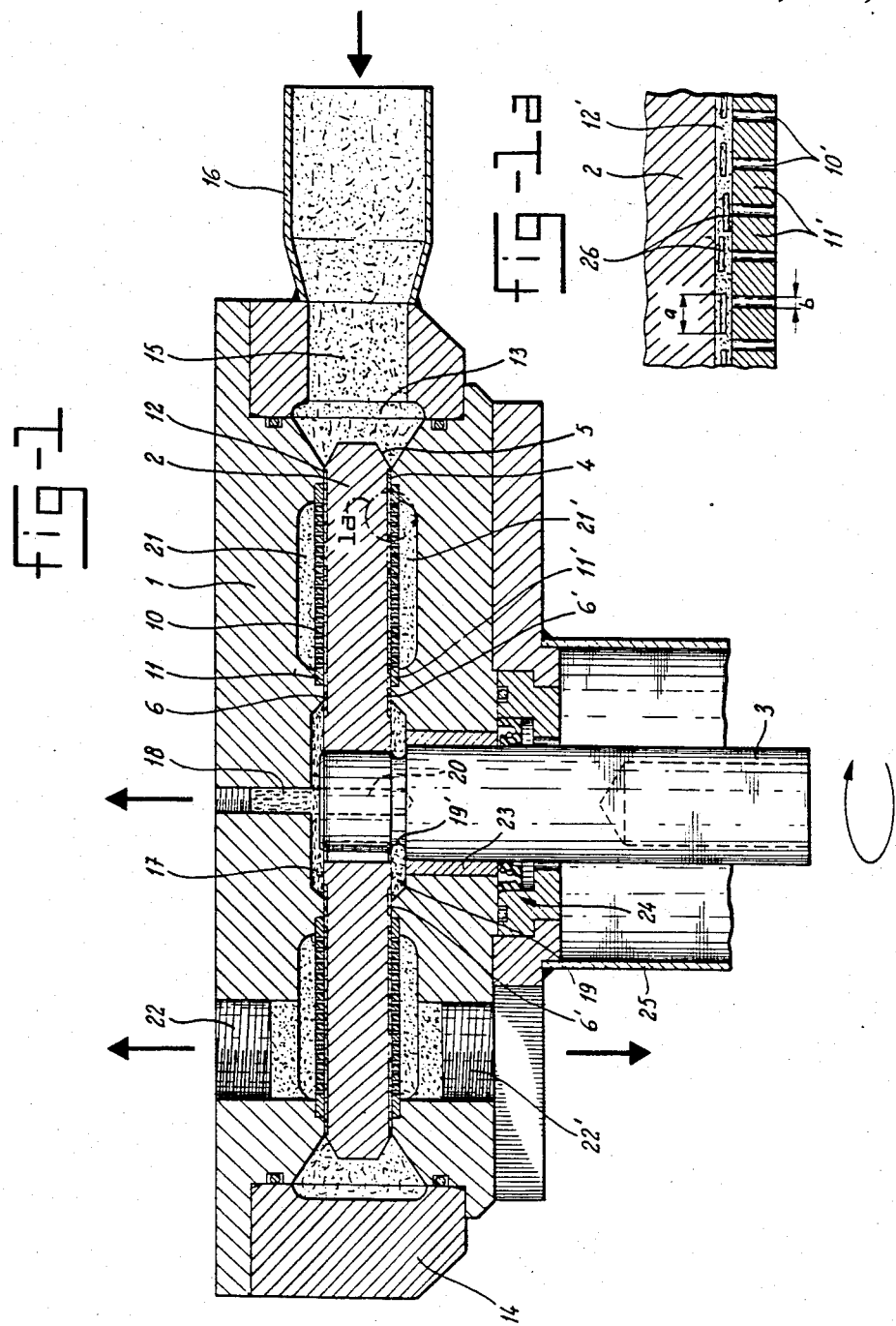
FIG. 1 shows a radial cross section of the apparatus according to the invention.
Figure 2:
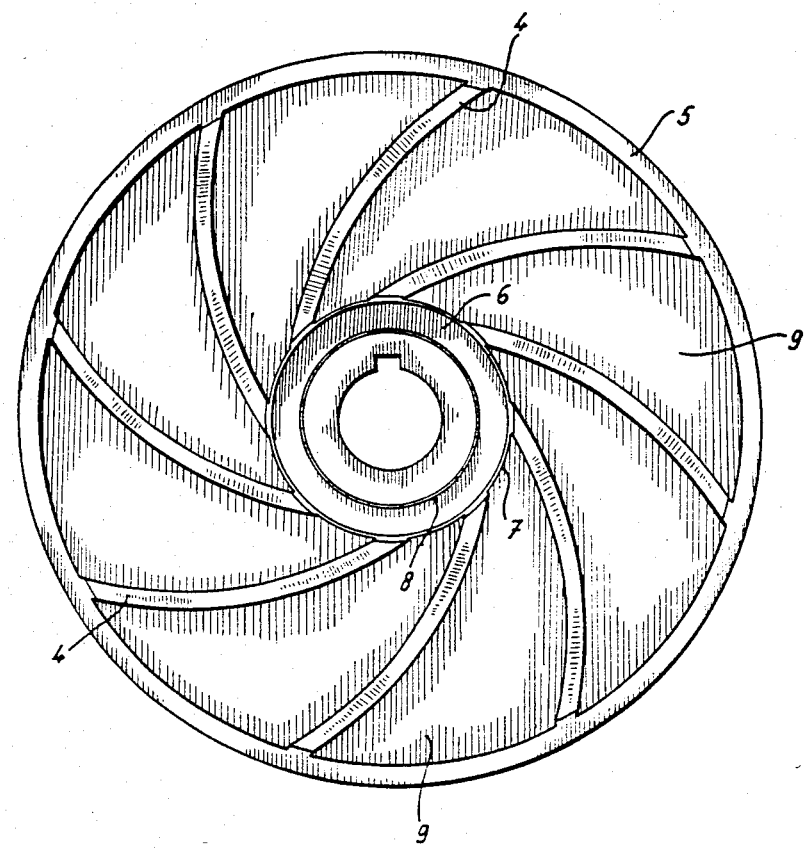
FIG. 2 is a plan view of the rotatable disk in FIG. 1.

As shown in FIG. 1 the apparatus according to the invention comprises a housing 1 in which a circular plate 2 is disposed mounted on the end portion of a rotatable shaft 3. At both of its surfaces the rotatable plate 2 is provided with a set of protruding curved strip-shaped elements 4, extending from the bevelled circumference 5 of the plate to an annular space 6, which annular space 6 is bounded by a bevelled edge 7 and a bevelled edge 8, so that the bottom of said space 6 is slightly deeper than the surface portions 9 between the elements 4. (see FIG. 2)

The strip-shaped elements 4 at both sides of the plate 2 bear against the annular plates 11 and 11' respectively provided with apertures 10 and 10' respectively, so that between the rotatable plate 2 and the apertured plates 11 and 11' two slit-shaped channels 12 and 12' respectively are formed the width of which is defined by the height of the strip-shaped elements 4.

In the housing 1 an annular space 13 is formed extending around the circumference of the plate 2 and closed by the ring 14 in which a bore 15 is provided in connection to the feed 16, while the annular space 13 communicates with both slit-shaped channels 12, 12'.

The discharge ends of the annular channels 12, 12' are defined by the annular spaces 6, 6'. At the other side the annular space 6 communicates with the central space 17 formed in the housing 1 and bounded at its lower side by the end face of the shaft 3 and the portion of the plate 2 surrounding it. By means of the bore 18 the space 17 communicates with a discharge for the separated solid particles. At the other side, the annular space 6' communicates with an annular space 19 formed in the housing 1 and bounded partially by the circumferential groove 19' formed in the shaft 3. By means of radial bores not-shown the space 19, 19' communicates with the axial bore 20 which opens into the space 17.

Opposite to the sides of the apertured plates 6, 6' facing from the plate 2 the annular spaces 21, 21' are formed in the housing 1 which spaces serve to receive the portions of the mass coming ouside through the apertures 10 and 10' respectively. Said annular spaces 21, 21' communicate with the discharge openings 22 and 22' respectively formed in the housing 1.

The shaft 3 is supported in the housing by means of the bushing 23, in which a sealing assembly 24 is provided. The housing 1 is supported by a support 25.

In operation of the apparatus the mass to be treated in particular a mass of meat is advanced through the feed 16, and the bore 15 into the annular space 13 from which said mass is advanced through the slit-shaped channels 12, 12'. In passing through said channels 12, 12' the solid particles in the mass in particular the bone particles are directed as shown in FIG. 1a, so that said particles 26 extend with their largest dimension a substantially parallel to plate 11', and said particles cannot pass through the apertures 10' as the diameter b of said openings is smaller than the largest dimension a. However, the meat particles do pass through the apertures 10, 10' and are then received by the chambers 21, 21' from which said particles are discharged through bores 22, 22'. The solid particles 26 are advanced further through the channels 12, 12' into the annular space 6, 6'. From said annular space 6 said particles enter into the space 17 and are discharged through a discharge 18. From the annular space 6' the particles arrive in the annular space 18, 19 and from there through the bore 20 into the discharge 18. Because of the rotation of the plate 2 the elements 4 scrape continuously over the plates 11, 11', so that the meat particles cannot accumulate at and in the apertures 10,10', while moreover, by the curved shape of said elements 4 an additional propelling force in the direction to the center is excerted on the mass.

I claim:

1. A method of separating solid particles such as bone particles from a fluid mass of particles such as meat particles comprising the steps of moving a mass of the combined particles along a path comprised of a channel having a width less than the length of the shortest solid particles to be removed for orienting the solid particles to be removed so that their long dimension extends generally in a plane parallel to the direction of movement along the path, separating the fluid particles from the solid particles by permitting the fluid particles to escape from the path of movement in a direction generally perpendicular to the direction of movement of the mass along the path, at least a portion of said solid particles having a short dimension enabling them to pass radially outwardly with said fluid particles in the absence of said orientation and removing the solid particles at the end of the path.

2. A method as set forth in claim 1 wherein the fluid particles are removed by passing them through apertures in a wall defining one side of the channel, the apertures having a dimension less than the smallest of the smallest dimension of the long dimension of the solid particles.

3. A method according to claim 2, characterized in that during the advancement of the mass through the channel a scraping action is exercised over the inner surface of the apertured wall.

* * * * *